US008478899B2

(12) United States Patent
Gan et al.

(10) Patent No.: US 8,478,899 B2
(45) Date of Patent: Jul. 2, 2013

(54) MANAGING COMMUNICATIONS WITH GLOBAL APPLICATIONS THROUGH MESSAGE HANDLERS

(75) Inventors: Jiuhe Gan, Cupertino, CA (US); Tong Zhu, Fremont, CA (US); Kenneth Tsz Ho, Belmont, CA (US); Zhaowei Charlie Jiang, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1414 days.

(21) Appl. No.: 11/874,062

(22) Filed: Oct. 17, 2007

(65) Prior Publication Data

US 2009/0106770 A1 Apr. 23, 2009

(51) Int. Cl.
*G06F 15/173* (2006.01)

(52) U.S. Cl.
USPC .......................................................... 709/238

(58) Field of Classification Search
USPC ................. 709/201, 206, 224, 227, 228, 243, 709/203, 238; 370/310, 352, 475, 389; 455/445, 455/466; 707/10
See application file for complete search history.

(56) References Cited

U.S. PATENT DOCUMENTS

| | | | | |
|---|---|---|---|---|
| 6,956,831 B1 * | 10/2005 | Mahr | | 370/310 |
| 6,965,911 B1 * | 11/2005 | Coffman et al. | | 709/201 |
| 7,558,861 B1 * | 7/2009 | Qidwai et al. | | 709/227 |
| 7,684,787 B2 * | 3/2010 | Qu et al. | | 455/412.1 |
| 7,941,557 B2 * | 5/2011 | Zhu et al. | | 709/238 |
| 8,150,960 B2 * | 4/2012 | Kumbalimutt | | 709/224 |
| 2002/0080822 A1 * | 6/2002 | Brown et al. | | 370/475 |
| 2002/0147645 A1 * | 10/2002 | Alao et al. | | 705/14 |
| 2003/0110266 A1 * | 6/2003 | Rollins et al. | | 709/227 |
| 2004/0006538 A1 * | 1/2004 | Steinberg et al. | | 705/39 |
| 2004/0142707 A1 * | 7/2004 | Midkiff et al. | | 455/466 |
| 2005/0020270 A1 * | 1/2005 | Buckley | | 455/445 |
| 2005/0027853 A1 * | 2/2005 | Martin et al. | | 709/224 |
| 2005/0038855 A1 * | 2/2005 | Martin et al. | | 709/206 |
| 2005/0078660 A1 * | 4/2005 | Wood | | 370/352 |
| 2005/0195799 A1 * | 9/2005 | Burne et al. | | 370/352 |
| 2006/0039371 A1 * | 2/2006 | Castro et al. | | 370/389 |
| 2006/0155857 A1 * | 7/2006 | Feenan et al. | | 709/227 |
| 2006/0194595 A1 * | 8/2006 | Myllynen et al. | | 455/466 |
| 2007/0077949 A1 * | 4/2007 | Henderson et al. | | 455/466 |
| 2007/0136431 A1 * | 6/2007 | Sun | | 709/206 |
| 2007/0192325 A1 * | 8/2007 | Morris | | 707/10 |
| 2008/0263212 A1 * | 10/2008 | Goix et al. | | 709/228 |
| 2009/0204724 A1 * | 8/2009 | Xiao et al. | | 709/243 |
| 2009/0252153 A1 * | 10/2009 | Choi et al. | | 370/352 |
| 2009/0292766 A1 * | 11/2009 | Morris | | 709/203 |
| 2010/0279667 A1 * | 11/2010 | Wehrs et al. | | 455/414.1 |
| 2011/0040838 A1 * | 2/2011 | Damarla et al. | | 709/206 |

* cited by examiner

*Primary Examiner* — Imad Hussain

(57) ABSTRACT

A system, apparatus, and method are directed towards managing communications with global applications through message handlers. The message is received by a first message handler that is local to the client device. The first message handler determines if the message is to be forwarded to a global application, and if so, forwards the message to a second message handler, which is configured to be local to the global application. The second message handler forwards the message and receives a response from the global application. The second message handler may then generate a session identifier that is useable to manage its session data for the message/response. The session identifier is sent to the first message handler in lieu of sending the session data, such that the two message handlers manage separately their own session data for the session. The session identifier is useable to relate the separately managed session data sets.

19 Claims, 8 Drawing Sheets

MANAGING COMMUNICATIONS WITH GLOBAL APPLICATIONS THROUGH MESSAGE HANDLERS

FIELD OF THE INVENTION

The invention relates generally to mobile communications, and more particularly, but not exclusively to managing global Short Messaging Service (SMS) applications.

BACKGROUND OF THE INVENTION

The use of mobile technologies is steadily on the increase, for both business and personal uses. Mobile phones are a common sight today and many people own personal information management (PIM) devices, palmtop computers, and so forth, to manage their schedules, contacts, and to stay connected with friends, family, and work. Employees on the move often appreciate the value of staying connected with their business through a variety of mobile devices.

With such a variety of mobile devices, one can receive email messages, Instant Messaging (IM) messages, and Short Message Service (SMS) text messages, in addition to regular voice calls. Recently, the use of SMS and other forms of text messaging has become very popular.

Such popularity may be due, at least in part, because many mobile devices, such as mobile phones, and the like, provide support for text messaging. A user can send text messages to others even when that person has not turned on their mobile device or when they are in a location where a wireless signal might be temporarily unavailable. The popularity may also be due in part to the wide variety of applications that are available to the user of text messaging. Examples of such applications include, but are not limited to person-to-person text messaging; applications that provide information to the mobile user including, but not limited to news, weather, financial information, and the like; applications for downloading of binary data including but not limited to ring-tones, wallpapers, pictures, logos, and so forth. A user may also employ applications through text messaging that provide alert notification of email messages, fax, home monitoring alerts, or even voice message alerts.

However, on the application development and support side, developing and managing such applications may be difficult, especially if it is desirable to port the application to another country, to interface the application with yet another carrier, or to upgrade applications that may need to be supported on across multiple countries, carriers, or the like. Porting applications may involve, not only testing the application with different hardware, protocol interfaces, and the like, but, may also include modifying and/or customizing the application to interact with different carrier's policies, procedures, or the like. Managing of applications across diverse regions, countries, carriers, and so forth, may become an expensive and time-consuming activity. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Figure 1:
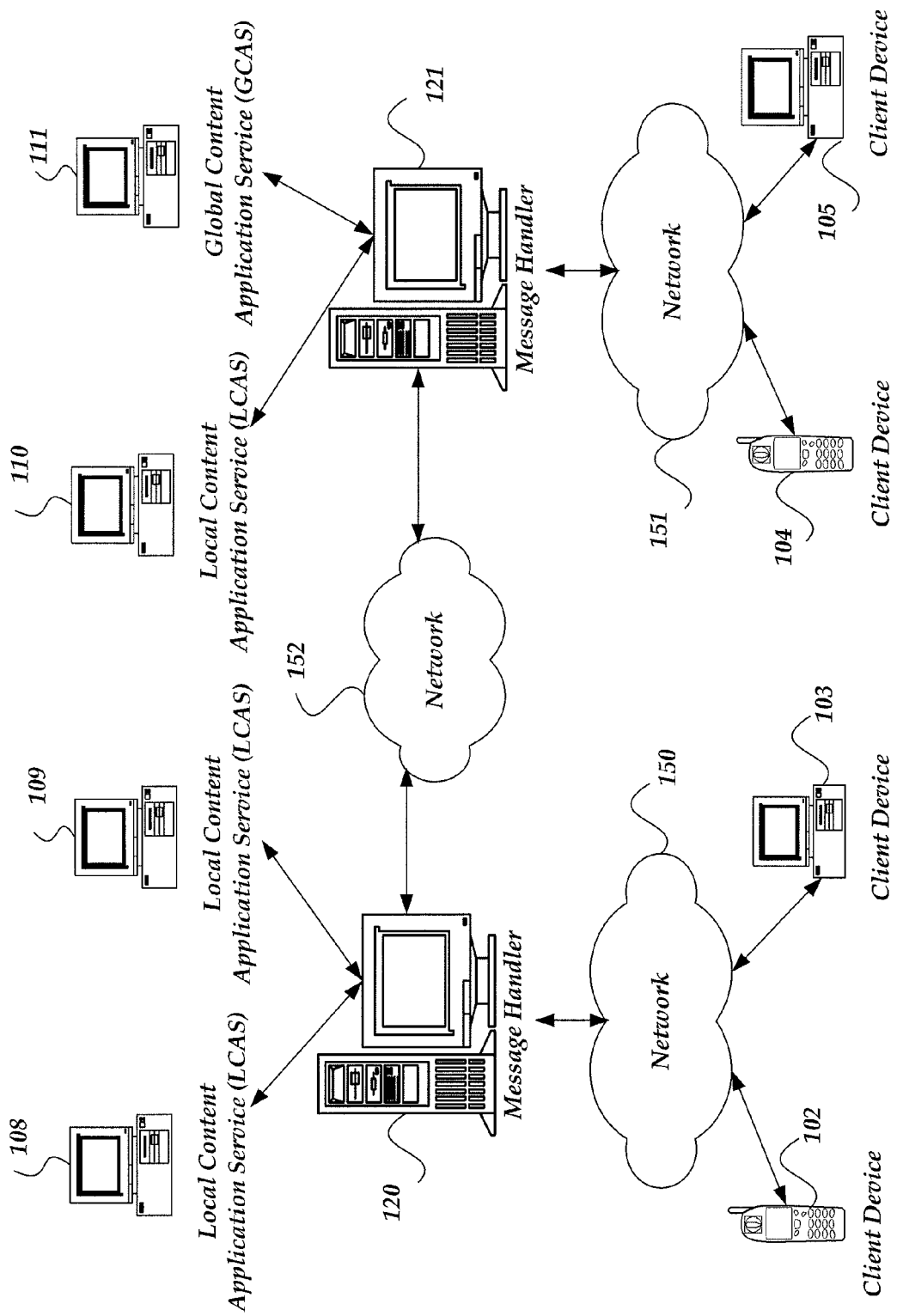
FIG. 1 shows a functional block diagram illustrating one embodiment of an environment for practicing the invention.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term Short Message Service (SMS) refers to a communication mechanism for providing connectionless transfers of limited size messages between networked devices. SMS messages may be cell broadcast services which are periodically delivered short message to a pre-defined set of computing devices in a given area, or point-to-point services which include short messages sent to a specific user. The SMS protocol is described in more detail in International Standard ISO/IEC 21989, which is available at through the International Standards Organization (ISO). As used herein, SMS refers to all such Short Message communications, and those derived therefrom.

As used herein, the terms "text messaging," or "text message" refer to SMS messaging, as well as a variety of other limited size message protocols, including, but not limited to Instant Messaging (IM), Multimedia Messaging Service (MMS) message, or an Enhanced Message Service (EMS) messaging protocols.

Moreover, the terms "mobile originated," and "MO" refer to any communications that originates or is initiated from a mobile device, while the terms "mobile terminated," and "MT" refer to any communications that terminates at the mobile device. Thus, if an application, such as an email application, web service application, or the like, sends a message to a mobile device, such message is known as a MT type message. Similarly, a message sent by a mobile device to the application is known as a MO type message. Messages that are sent between two mobile devices are known as "mobile to mobile," or "MTM" communications.

The term "short code" refers generally to short strings of numbers or letters to which a message may be addressed and includes a common addressing scheme for participating wireless networks. Examples of short codes might include, "92466," "445566," or the like. However, it is clear that short codes may also include alpha characters, or other symbols. Short codes may also include short code extensions, or simply "extensions." Such "extensions" may include virtually any alpha character, a numeric character, symbol, and/or any combination of alpha, numeric, and/or symbols. For example, typical short code extensions may employ a numeric range of numbers, such as from '000' to '100.' Short code extensions may also include non-contiguous sequences of numbers, or the like. Thus, in one embodiment, a network carrier may have allocated, for example, one sequence of short code extensions from 921-925, and another sequence, for example, from 891-910, or the like. It should be recognized that different network carriers may have different sequences of assigned short codes, extensions, ranges and/or sequences of short codes, or the like. Thus, the invention is not constrained to these short code examples, and other short codes, extensions, or the like, may also be employed. It is further recognized that in many articles, publications, or the like, the term short code may sometimes refer to both the short code itself and an extension. Therefore, as used herein, the term short code includes an extension, unless otherwise so indicated, without departing from the scope of the invention.

The term "service short code" refers to a short code that is assigned to an application, service, or the like. Service short codes may be assigned to different applications, services, or the like, for different network carriers. Moreover, multiple applications may share the same service short codes.

As used herein, the terms "local," "remote," and "global" refer to how an application is related to a message handler. As described below in more detail, an application may be considered to be local to a message handler when the application communicates directly with that message handler, and not through another message handler. An application is considered to be remote to a message handler when a message to or from the application is directed through another message handler. Thus, an application may be local to one message handler, while being remote to another message handler. An application may be considered to be a global application if it receives from, and/or send messages through a local message handler to multiple message handlers. Similarly, a client device may be considered local or remote to a message handler (or vice versa) based on whether a message from or to the client device is handled by a single message handler (a local message handler to the client device), or is handled by multiple message handlers. A message handler removed by one or more message handlers from the client device in a communication path, is remote from that client device.

Briefly stated, the various embodiments are directed towards a system, apparatus, and method for managing communications with global applications through message handlers. In one embodiment, the messages are SMS messages to an application. However, other message formats, and/or protocols may also be employed. In one embodiment, a client device may send a message towards an application. The message is received by a first message handler that is local to the client device. The first message handler determines if the message is to be forwarded to a local application or a global application. In one embodiment, the determination may be based, in part, on content of the message. If the message is to be sent to a global application, the message is forwarded to a second message handler, which is configured to be local to the global application. The second message handler receives the message, and an application identifier. In one embodiment, the second message handler also receives a client device identifier that may be used to identify a location of the client device. The application identifier may then be used to forward the message to the global application.

When a response is received from the global application, the second message handler generates a session identifier. The second message handler stores local session data that may include the response, the client device identifier, the message, the session identifier, and the like. The response and the session identifier are sent to the first message handler. In one embodiment, the second message handler determines where to send the response based, in part, on the client device identifier. When the response is received by the first message handler, the first message handler may allocate a short code and/or short code extension for the response. The short code and/or extension may be used as an index for storing session data associated with the response that is local to the first message handler, including the session identifier, the response, and whether the application that responded is a global or local application. The response and short code and/or short code extension may then be forwarded to the client device. By employing the session identifier between the multiple message handlers, session data that is useable in determining how to manage a message/response may be created and/or managed local to the message handler. That is, the session data need not be sent over the network and instead the session identifier may be sent in lieu of sending the session data. Thus, the session data need not be managed in a global data store for multiple message handlers, avoiding a single point of failure. Moreover, management of global messaging may be made more efficient, and potentially less costly, than, for example, managing multiple replicated data stores and/or distributing session data with a message and/or response over a network. Additional messages from or to the client device may then take advantage of the session identifier to manage the global application communications, as described in more detail below.

Illustrative Operating Environment

FIG. 1 shows components of an exemplary environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(networks) 150-

152, message handlers 120-121, client devices 102-105, local content application services (LCAS) 108-110, and global content application service (GCAS) 111.

As shown, client devices 102-103 are in communication with message handler 120 through network 150, while client devices 104-105 are in communication with message handler 121 through network 151. Thus, it may be seen that client devices 102-103 are local to message handler 120, while client devices 104-105 are local to message handler 121. Message hander 120 is configured and arranged to communicate with and otherwise manage messages between LCAS 108-110 and/or GCAS 111, which may be considered to be local to message handler 120. Similarly, message hander 121 is configured and arranged to communicate with and otherwise manage messages between LCAS 110 and GCAS 111, which may be considered to be local to message handler 120. Message handlers 120-121 may communicate with each other through network 152.

Generally, client devices 102-105 may include virtually any portable computing device capable of receiving and sending a message over a network, such as networks 150-151, and the like, to and from another computing device, another mobile device, and the like. Thus, client devices 102-105 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-105 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JAVASCRIPT™, Standard Generalized Markup Language (SMGL), HyperText Markup Language (HTML), eXtensible Markup Language (XML), and the like, to display and send a message.

Client devices 102-105 also may include at least one client application that is configured to receive content from another computing device. The client application may include a capability to provide and receive textual content, graphical content, audio content, and the like. The client application may further provide information that identifies itself, including a type, capability, name, and the like. In one embodiment, client devices 102-105 may uniquely identify themselves through any of a variety of mechanisms, including a phone number, Mobile Identification Number (MIN), an electronic serial number (ESN), or other client device identifier. The information may also indicate a content format that the client device is enabled to employ. Such information may be provided in a message, or the like, to other computing devices.

Client devices 102-105 may be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device. However, the present invention is not limited to these message protocols, and virtually any other message protocol may be employed.

Client devices 102-105 may be further configured to enable a user to participate in communications sessions, such as IM sessions, and the like, and to transfer an existing communications session, and the like, between devices. As such, client devices 102-105 may include a client application that is configured to manage various actions on behalf of the client device. For example, the client application may enable a user to interact with the browser application, email application, IM applications, SMS application, and the like, to manage signing into a communications session, such as an IM session, between the devices. In one embodiment, the client application might be the SMS application.

Client devices 102-105 may further be configured to include a client application that enables the end-user to log into an end-user account that may be managed by another computing device. Such end-user account, for example, may be configured to enable the end-user to receive emails, send/receive IM messages, SMS messages, access selected web pages, and the like. Moreover, the end-user account may be further configured to enable the end-user authorization to start an IM session, or other communications session, on a mobile device.

Client devices 102-105 may each receive messages sent from LCAS 108-110, GCAS 111, or even from one of the other client devices 102-105, or another computing device. Client devices 102-105 may also send messages to one of LCAS 108-110, GCAS 111, or the like. In one embodiment, messages from LCAS 108-110 and/or GCAS 111 may include a short code and extension that a user of the receiving mobile device may then use to communicate with one of LCAS 108-110 and/or GCAS 111. For example, the short code and extension may be part of a header in a message received by client devices 102-105, such as in a source address or "from" header, or the like. The short code and extension may then be used by the user for responding to the received message. However, in another embodiment, the short code and extension may be within a body of the message, associated with a link within the body of the message, or the like. In such events, the user may extract the short code and extension for use in sending messages to one of LCAS 108-110 and/or GCAS 111.

Networks 150-152 are configured to enable communications between message handlers 120-121 and/or client devices 102-105. Networks 150-152 are enabled to employ any form of computer readable media for communicating information from one electronic device to another. Also, networks 150-152 can include the Internet in addition to local area networks (LANs), wide area networks (WANs), direct connections, such as through a universal serial bus (USB) port, other forms of computer-readable media, or any combination thereof. On an interconnected set of LANS, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Networks 150-151 may also include any of a variety of wireless sub-networks that may further overlay stand-alone ad-hoc networks, and the like, to provide an infrastructure-oriented connection for client devices 102-105. Such sub-networks may include mesh networks, Wireless LAN (WLAN) networks, cellular networks, and the like.

Networks 150-151 may further include an autonomous system of terminals, gateways, routers, and the like connected by wireless radio links, and the like. These connectors may be configured to move freely and randomly and organize themselves arbitrarily, such that the topology of networks 150-151 may change rapidly.

Networks 150-151 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as client devices 102-105 with various degrees of mobility. For example, networks 150-151 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, networks 150-151 may include virtually any wireless communication mechanism by which information may travel between client devices 102-105 and another computing device, network, and the like.

Although not illustrated in FIG. 1, networks 150-151 may include a plurality of network carrier gateways (or carriers) that are configured to manage network communications between at least one of mobile devices 102-104, and another mobile device, and/or a computing device managed through network 105. Such carriers may have associated with them different policies for use of short codes, allocation of short codes, and or extensions.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

LCAS 108-110 and/or GCAS 111 include virtually any device that may be configured to provide an application service. Such application services or simply applications include, but are not limited to, email applications, search applications, video applications, audio applications, alert applications, graphic applications, social networking applications, text message applications, or the like. In one embodiment, LCAS 108-110 and/or GCAS 111 may operate as a web server. However, LCAS 108-110 and/or GCAS 111 are not limited to web servers, and may also operate as a messaging server, a File Transfer Protocol (FTP) server, a database server, a content server, or the like, in which to provide an application. Additionally, each of LCAS 108-110 and/or GCAS 111 may be configured to perform a different operation. Thus, for example, LCAS 108 may be configured as a messaging server, while LCAS 109 is configured as a database server, social networking server, or the like.

A distinction between LCAS 108-110 and GCAS 111, however is that GCAS 111 may be configured and arranged to manage messages on a global basis. That is, messages with, for example, client devices 102-103 may also be sent to/from GCAS 111, while it is unlikely, that messages from client devices 102-103 are sent to LCAS 110. Such distinction, however, is independent of GCAS 111 and/or LCAS 108-110, as there is an advantage in developing such application services independent of where it might be located and/or with which client device it may be communicating. It is one of the goals of the invention to configure message handlers 120-121 to manage location and/or carrier specific interface issues.

Devices that may operate as LCAS 108-110 and/or GCAS 111 include personal computers desktop computers, multi-processor systems, microprocessor-based or programmable consumer electronics, network PCs, servers, and the like.

LCAS 108-110 and/or GCAS 111 may also be configured to initiate a message to be sent to one of client devices 102-105, in one embodiment. Such messages typically are known as Mobile Terminated (MT) messages. Such messages may include, for example, an alert, an advertisement, a relayed message, a news message, or the like. In one embodiment, LCAS 108-110 and/or GCAS 111 may also respond to a request to perform some action, from one of client devices 102-105, or even another computing device. In one embodiment, LCAS 108-110 and/or GCAS 111 may employ short codes and extensions within messages sent to one of client devices 102-105. In one embodiment, LCAS 108-110 and/or GCAS 111 may request that a short code and/or extension be assigned to the message before it is sent to the destination client device. As such, in one embodiment, such assignment of short codes and/or extensions may be performed by message handlers 120-121.

Message handlers 120-121 are described in more detail below in conjunction with FIG. 2. Briefly, however, message handlers 120-121 include virtually any computing device that may be configured to receive and to route a message and/or a response to a message. Message handlers 120-121 determine, in part, which network carrier a message is to be routed through to one of client devices 102-105. Message handlers 120-121 may make such determination based on a variety of criteria, including, but not limited to a destination client device identifier, a service agreement, a quality of service, a cost of delivery of a message, an application type, a message type, or the like. In one embodiment, message handlers 120-121 may assign a short code and/or extension based on the determined network carrier, and the network carrier's short code policy and extension allocation specification.

Similarly, message handlers 120-121 might receive a message from one of client devices 102-105 to be routed to one of LCAS 108-109 or GCAS 111. Such messages typically are known as Mobile Originated (MO) messages. Message handlers 120-121 may determine which application service to send the message based on a short code, extension, or by examination of a message body, header, or the like, or the message. If it is determined that the message is to be forwarded to a local application service (LCAS 108-109 for message handler 120; LCAS 110, or GCAS 111 for message handler 121), the message may be forwarded by that message handler to the appropriate application service. If it is determined that the message is to be forwarded to a global application, such as from message handler 120, for example, then message handler 120 forwards the message to message handler 121 for further processing. Message handlers may determine if the application is a global application, in one embodiment, by examining a keyword in the message body, and then searching a data store, or the like, for an application that is associated with the keyword. If the application is identified as a global application, the message handler may then determine which message handler to forward the message. In one embodiment, the message handler may generate a routing key useable to route the message to the appropriate message handler. The routing key may be configured in any of a variety of ways. For example, in one embodiment, the routing key may comprise transport headers that might include an identifier indicating a source of the message (e.g., identifier for message handler 120) and a destination identifier (e.g., identifier for message handler 121). The forwarding local message handler (e.g., message handler 120) may include with the message additional information. In one embodiment, such information may include, but is not limited to, the message; an application identifier that indicates that the message is for GCAS 111, or the like; a client device identifier indicating which client device the message is from; or other information.

When the remote message handler (e.g. message handler 121) receives the message including the other information, the remote message handler may employ the application identifier to determine to which application the message is to be forwarded. When a response is received from GCAS 111, message handler 121 may then generate a session identifier, and session data associated with the message/response. The session identifier may then be sent back to the other message handler in lieu of sending the session data to the other message handler. In so doing, session data may be managed separately and local to each of the involved message handlers. When additional messages are communicated by the local message handler to the remote message handler for the same client device/global application session, the session identifier may be used to locate and/or otherwise identify the appropriate session data. The message handlers may employ processes described below in conjunction with FIGS. 4-8 to perform at least some of their actions.

Figure 2:
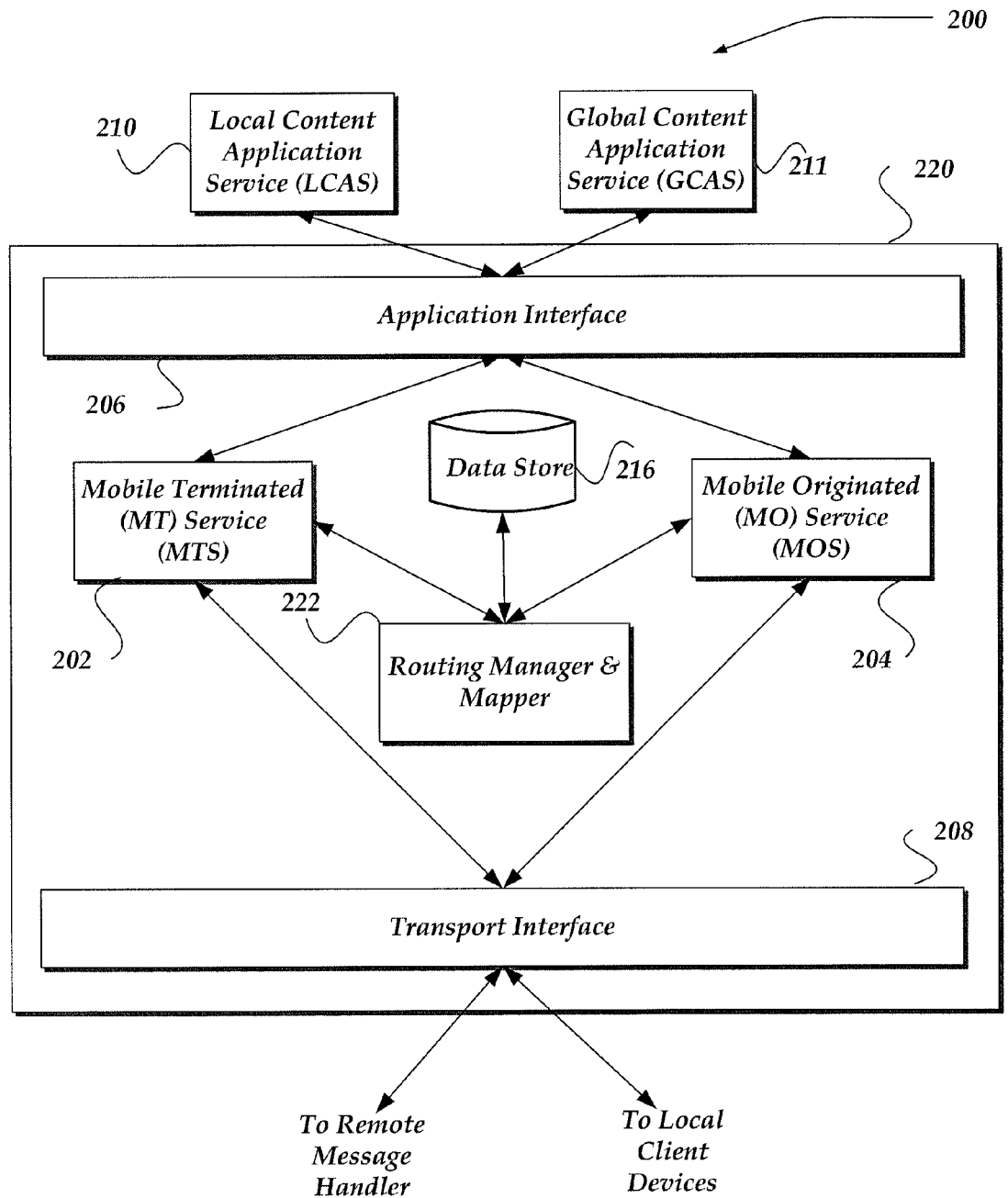
FIG. 2 shows a functional block diagram illustrating one embodiment of an expanded view and related interfaces for components within FIG. 1.

FIG. 2 shows a functional block diagram illustrating one embodiment of an expanded view and related interfaces for components within FIG. 1. System 200 may include many more or less components than those shown. The components shown, however, are sufficient to disclose an illustrative embodiment for practicing the invention.

As shown, system 200 includes message handler 220, LCAS 210, and GCAS 211. In one embodiment, message handler 220 may represent message handler 121 of FIG. 1. Message handler 220 includes application interface 206, transport interface 208, data store 216, routing manager/mapper (RMM) 222, MT service (MTS) 202, and MO service (MOS) 204. In one embodiment, message handler 220 provides an expanded view of components of message handler 121 of FIG. 1. However, the invention is not so limited, and message handler 220 may also be configured and arranged to represent message handler 120 of FIG. 1, without departing from the scope of the invention.

In one embodiment, messages may be received from a client device, such as client devices 102-105 of FIG. 1, through transport interface 208 from a carrier gateway. Such messages may be received by MOS 204. In another embodiment, the message may also be received from another message handler by MOS 204.

Looking first at messages from a client device, such as messages may be received from a client device that is local to message handler 220 such a message is directed towards MOS 204. MOS 204 may, in one embodiment, provide the message, or portions of the message, to RMM 222 to determine to which application the message should be forwarded.

RMM 222 may examine the message, message header, or the like, to determine whether a service code, short code and extension, or the like, is specified. In one embodiment, additional information within the content of the message might also be used to determine the application to receive the message. Such additional information may include, for example, keywords that may indicate an associated application.

If the message is not associated with a short code, extension, or the like, then it is likely that the message is not currently associated with a session with an application service. Thus, RMM 222 may determine from the analysis of keywords, or the like, the appropriate application to which the message is to be sent. If it is determined that the application is a global application that is remote from message handler 220, then message handler 220 may determine a routing key or other mechanism to route the message to the appropriate remote message handler. The routing key may be configured in virtually any form. In one embodiment, the routing key may be configured to operate as a routing header that includes a source identifier for message handler 220, and a destination identifier indicating the appropriate destination message handler for the message.

If an assigned short code and extension is identified, RMM 222 may search data store 216 for associated session data. Such session data may include the message, the message headers, a destination identifier, an application identifier, a user identifier including, for example, a user name, user account, a user alias, or the like. The session data, however, is not limited to this information, and other information may also be collected and stored, including time related information that may be employed to determine an age of a communication session. RMM 222 may employ the session data to determine to which application the message is to be forwarded. RMM 222 may provide such information, including the session data, to MOS 204 such that the message may be forwarded to the determined application. If the application is determined to be local to message handler 220, the message and the session data may be provided to the local application.

As noted above, message handler 220 may also be configured to receive a message from another message handler. Thus, for example, as illustrated in FIG. 1, message handler 120 might receive and send the message to message handler 121. Such messages are typically directed towards a global application service, such as GCAS 211, or the like. Thus, message handler 220 may operate as a remote message handler to the sending client device.

Messages received from the other message handler may include information about which application the message is to be forwarded. In one embodiment, such information might include an application identifier for the global application. The received message may also include additional information, including, but not limited to a client device identifier identifying the source of the message, user identifier, or the like. Where the message is associated with an existing session between the client device and global application, the message may also include a session identifier, as described further below.

Where the message is not currently associated with a session between the client device, and the global application, MOS 204 may examine the message including the additional information to determine which application to send the message. MOS 204 may then forward the message to the appropriate global application, e.g. GCAS 211. In one embodiment, the message may be received through application interface 206. Application interface 206 may represent any of a variety of communication interfaces, including, but not limited to HTTP interfaces, or the like.

GCAS 211 may represent, for example, GCAS 111 of FIG. 1. In any event, GCAS 211 may receive and act upon the message, providing a response. The response may then be forwarded to MTS 202, through the application interface 206. MTS 202 may then determine whether the response is to be provided to a local client device, a remote local device. In one embodiment, MTS 202 might determine where to send the response based on the client device identifier associated with the message/response. For example, where the client device identifier is a phone number, it might include an area code, country code, or the like, indicating that the client device is in a different region, country, or the like, that is managed through a different message handler.

If it is determined that the response is to a remote client device, MTS 202 may generate a session identifier. MTS 202 may, in one embodiment, employ RMM 222, in part, to generate the session identifier. In any event, MTS 202 may include the session identifier with the response that is then forwarded to a message handler determined to provide support to the destination client device. MTS 202 may also employ RMM 222 to generate and store into data store 216, session data for the message/response session. The session identifier may, in one embodiment, be employed to index, store, and retrieve the session data.

If the message is a local message, or is received from a remote message handler, MTS 202 may then identify a carrier gateway (network carrier) through which the message is to be sent towards a destination client device. MTS 202 may make such determination based on a variety of criteria, including, but not limited to a client device identifier associated with the message. If it is determined that the client device is local to message handler 220, or received from a remote message handler, MTS 202 then may request an allocation of a short code and/or extension from RMM 222. RMM 222 may employ any of a variety of mechanisms to determine a short code and/or extension for the message.

In one embodiment, RMM 222 may employ a short code policy for the determined network carrier to allocate/re-allocate short codes and extensions. In one embodiment, an application might provide a short code and/or extension that might then mapped to a short code and extension within the policy specified by the network carrier. Thus, in one embodiment, applications may be configured to be independent of network specific short codes and extensions. RMM 222 may, in one embodiment, manage the mapping to a specific network carrier, relieving the applications from additional workloads. Mechanism for allocating/re-allocating short codes and/or extensions may include, but are not limited to a dynamical recycle allocation policy, where the extensions may be allocated dynamically. Another allocation policy includes the range recycle allocation policy. In this policy, allocation of extensions may occur from a range of extensions reserved from an application. When the all of the extensions within the range are allocated, the oldest currently assigned session's extension may be reused, or assigned to another session/message. In one embodiment, the age of a session might be indicated by its last-modification time. However, other age indicators may also be used. Yet another allocation policy includes a pass-through allocation policy. In this policy, one or more ranges of short code and extensions may be reserved for an application. Thus, the application may allocate the short code and/or extension by itself from the reserved range (s). Still another allocation policy includes re-use key based allocation, which refers to allocation of a short code and extension from a range of reserved short codes and extensions for an application. When the range of short code and extensions are allocated, a selection of a short code and extension for re-allocation may be based on the oldest session. In one embodiment, short codes and extensions may be specific to an application. Thus, re-allocation of extensions may be performed from within an application specific short code and extension range and further from a group of sessions associated with that application. Such examples of allocation/re-allocation are described in more detail in co-pending U.S. patent application Ser. No. 11/853,618, entitled "SMS Shortcode Allocation," filed on Sep. 11, 2007, to Jiuhe Gan et al, which is incorporated herein by reference.

It should be recognized however, that the invention is not limited to these example extension allocation policies and more or less extension policies may be used. Moreover, different extension policies than those described may also be implemented, without departing from the scope of the invention.

Once the short code and/or extension are determined for the response message, MTS 202 may request that session data for the message/response session be stored into data store 216. In one embodiment, MTS 202 may store the session data using the short code and/or extension as an index to the session data. However, the invention is not constrained to this approach, and other mechanisms may also be used.

Where the response is received from a remote message handler, MTS 202 will have also received with the response a session identifier. Thus, when a session identifier is received, MTS 202 may also request that the session identifier also be stored in data store 216 and is associated with the session data for the message/response session. In addition, in one embodiment, MTS 202 may identify with the session data information indicating whether the associate application service for the session is a global application or a local application. Such information may enable MOS 204 and/or RMM 222 to make a quicker determination of which application to route another message, rather than examining keywords within the message and/or performing other extensive analysis.

As noted above, in one embodiment, MTS 202 and/or RMM 222 may modify the response to include the short code and/or extension. MTS 202 may then employ transport interface 208 to enable sending of the modified message to the destination mobile device using the carrier gateway associated with the determined network carrier.

As another message is received from the same client device, the short code and/or extension may be used to find, in one embodiment, related session data. Such session data may include indication of whether the application to send the other message is local or global. If it determined to be global, the stored session identifier may be sent to the appropriate remote message handler to enable the remote message handler to locate the session data that it manages for the session. By using the session identifier to relate locally stored and separately managed session data, the session data need not be sent across the network between message handlers. Nor is there a need for a centrally managed session data store for multiple message handlers, thereby avoiding network loads, resource loads, and the like. Message handlers, such as message handler 220 may employ at least portions of the processes described below in conjunction with FIGS. 4-8 to perform at least some of their actions.

It should be noted that while data store 216 is illustrated to reside within message handler 220, the invention is not so limited. Such data stores may also reside within another computing device, without departing from the scope of the invention. Thus, for example, where the data store resides in another computing device, the data store may still be referred to as a local data store, as it is typically configured and arranged to manage session data to a single message handler—thus, local to a single message handler.

Illustrative Server Environment

Figure 3:
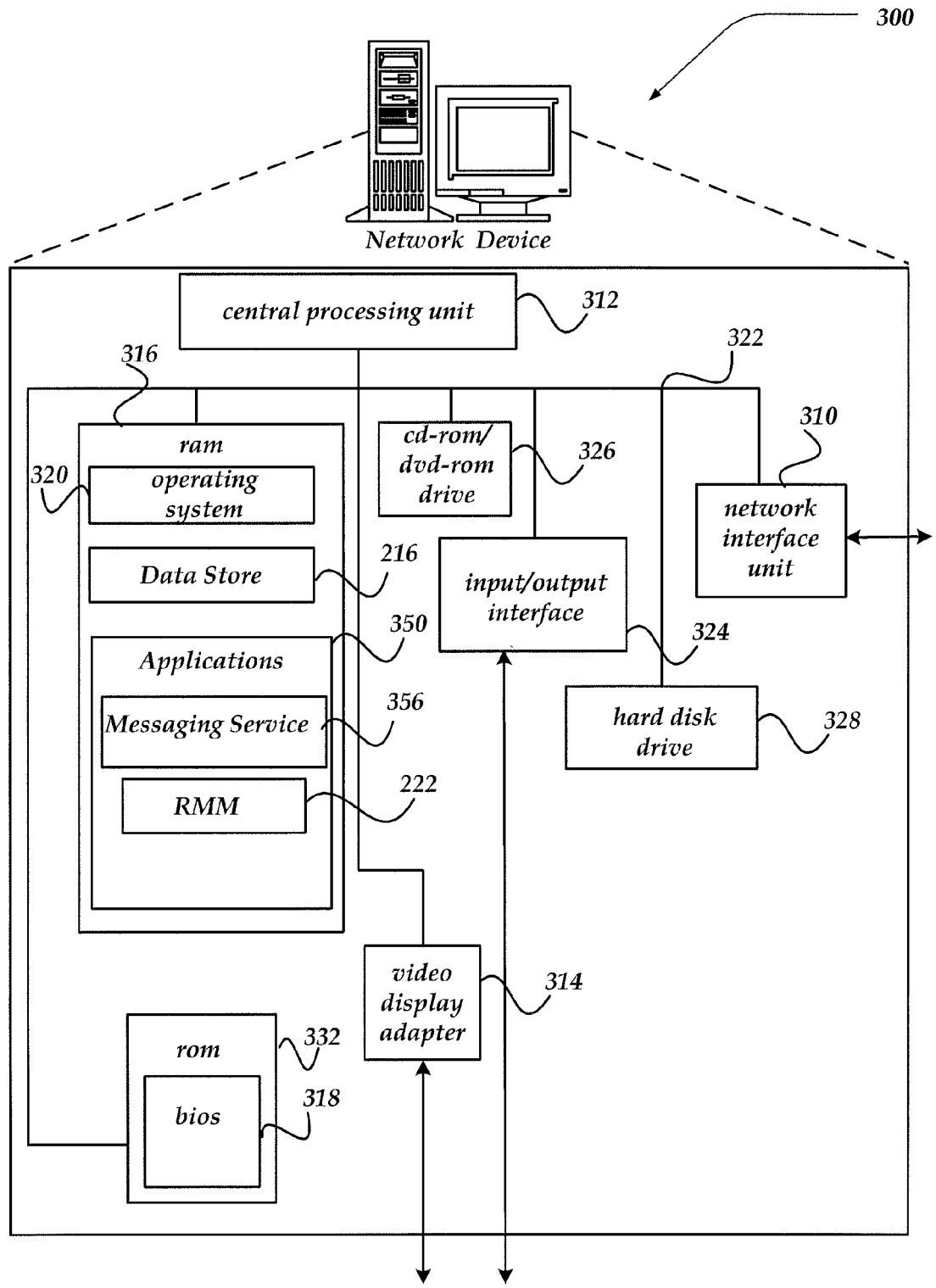
FIG. 3 shows one embodiment of a server device that may be included in a system implementing the invention.

FIG. 3 shows one embodiment of a server device, according to one embodiment of the invention. Server device 300 may include many more components than those shown. The components shown, however, are sufficient to disclose an illustrative embodiment for practicing the invention. Server device 300 may, for example, message handler 120-121 of FIG. 1.

Server device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of server device 300. Any general-purpose operating system may be employed. Basic input/output system ("BIOS") 218 is also provided for controlling the low-level operation of server device 300. As illustrated in FIG. 3, server device 300 also can communicate with the Internet, or some other communications network, such as network 105 in FIG. 1, via network interface unit 310, which is constructed for use with various communication protocols including the TCP/IP protocol. Network interface unit 310 is sometimes known as a transceiver, transceiving device, network interface card (NIC), and the like.

Server device 300 may also include an SMTP handler application for transmitting and receiving email. Server device 300 may also include an HTTP handler application for receiving and handing HTTP requests, and an HTTPS handler application for handling secure connections. The HTTPS handler application may initiate communication with an external application in a secure fashion.

Server device 300 also includes input/output interface 324 for communicating with external devices, such as a mouse, keyboard, scanner, or other input devices not shown in FIG. 3. Likewise, server device 300 may further include additional mass storage facilities such as CD-ROM/DVD-ROM drive 326 and hard disk drive 328. Hard disk drive 328 is utilized by server device 300 to store, among other things, application programs, databases, and the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs include email programs, schedulers, calendars, transcoders, messaging services, database programs, word processing programs, spreadsheet programs, and so forth. Mass storage may further include applications such as data store 216, messaging service 356, and RMM 222.

Data store 216 may include virtually any mechanism configured and arranged to store and otherwise manage short codes, extensions, and session data. Data store 216 may also be configured, in one embodiment, to manage or otherwise provide information useable to access a short code policy for a network carrier. In one embodiment, session data may be stored using a short code and extension. However, the invention is not so limited, and other indexing mechanisms may also be used. For example, in one embodiment, a session identifier, client device identifier, or the like, may also be used to index the data. Data store 216 may be implemented using, for example, a database, a script, a spreadsheet, a file structure, folders, a program, or the like. As noted above, data store 216 need not reside within network device 300, and may also reside within another computing device. Moreover, it should be understood that data store 216 may also reside all or in part across hard disk drive 328, cd-rom/dvd-rom drive 326, memory 316, or any of a variety of other storage mediums.

RMM 222 is substantially similar to RMM 222 of FIG. 2. Messaging service 356 may be considered as one embodiment, of various components of message handler 220, including, for example, application interface 206, transport interface 208, MTS 202, MOS 204, or the like. While messaging service 356 represents one implementation of such components, the invention is not so limited. For example, each of these components may also be implemented within network device 300 separately, or in virtually any other arrangement. Moreover, in one embodiment, one or more of these components may be distributed across multiple network devices, without departing from the scope of the invention.

Generalized Operation

Figure 4:
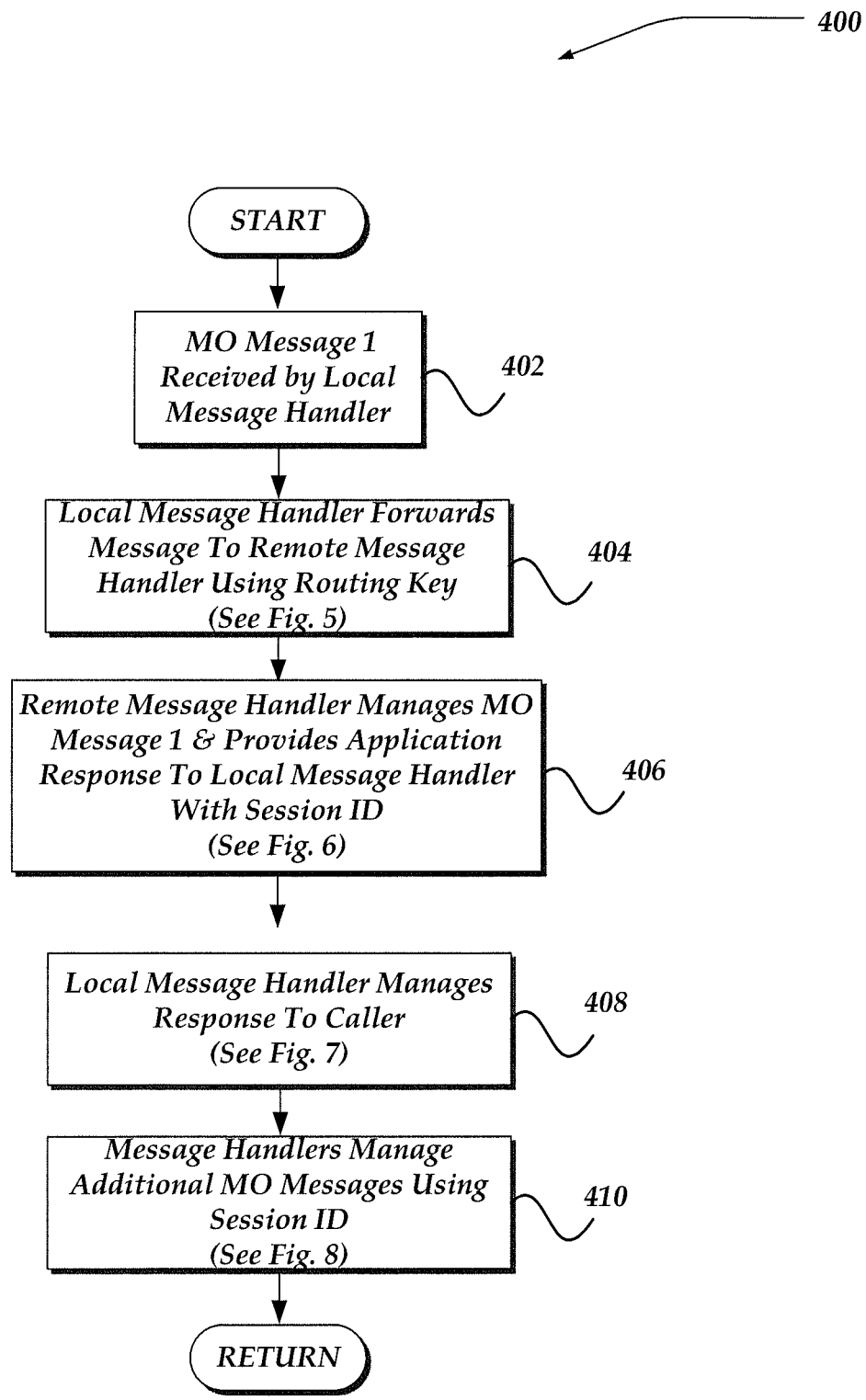
FIG. 4 illustrates a logical flow diagram generally showing one embodiment of an overview process for managing messages between a global application using message handlers.

The operation of certain aspects of the invention will now be described with respect to FIGS. 4-8. FIG. 4 illustrates a logical flow diagram generally showing one embodiment of an overview process for managing messages between a global application using message handlers. Thus, process 400 of FIG. 4 is directed towards illustrating actions that may be performed by a local message handler (local to the client device), and/or a remote message handler (remote to the client device). Thus, in one embodiment, portions of process 400 may be implemented within, for example, message handler 120, and/or message handler 121.

As shown, process 400 begins, after a start block, at block 402, where a message originated from a client device is received by a message handler that is local to the client device. The process continues next to block 404, where one embodiment is described in more detail below in conjunction with FIG. 5. Briefly, however, process 400 makes the assumption that the received message is to be directed to a global application that is managed by a remote message handler. As described above, the message might instead be directed towards a local application. However, where the message is to be managed by a remote global application, in block 404, the message is forwarded to the remote message handler using, in one embodiment, a routing key, such as described above. Moreover, as noted above, the message may also be forwarded with an identifier indicating which global application is to receive the message.

Processing flows next to block 406, which is described in more detail below in conjunction with FIG. 6. Briefly, however, and continuing the assumption that the message is for a remotely managed global application, at block 406, the remote message handler manages the received message, provides it to a global application. In one embodiment, the application identifier received with the message may be used to direct the message. When a response is received from the global application, the response, together with a session identifier is sent to the local message handler.

Processing continues next to block 408, which is described in more detail below in conjunction with FIG. 7. Briefly, however, at block 408, the local message handler may determine a short code and/or extension for the response, and save its own local session data for the message/response session. In one embodiment, the response might be modified to include the determined short code and/or extension. The local message handler may then forward the response to the client device, through a designated carrier for the client device.

Process 400 continues to block 410, where another message might be received from the client device. Block 410 is described in more detail below in conjunction with FIG. 8. Briefly, however, at block 410, the session identifier may be retrieved at the local message handler and sent to the remote message handler in lieu of sending session data. As such, each message handler is enabled to map their local session data with the session based on the session identifier.

Figure 5:
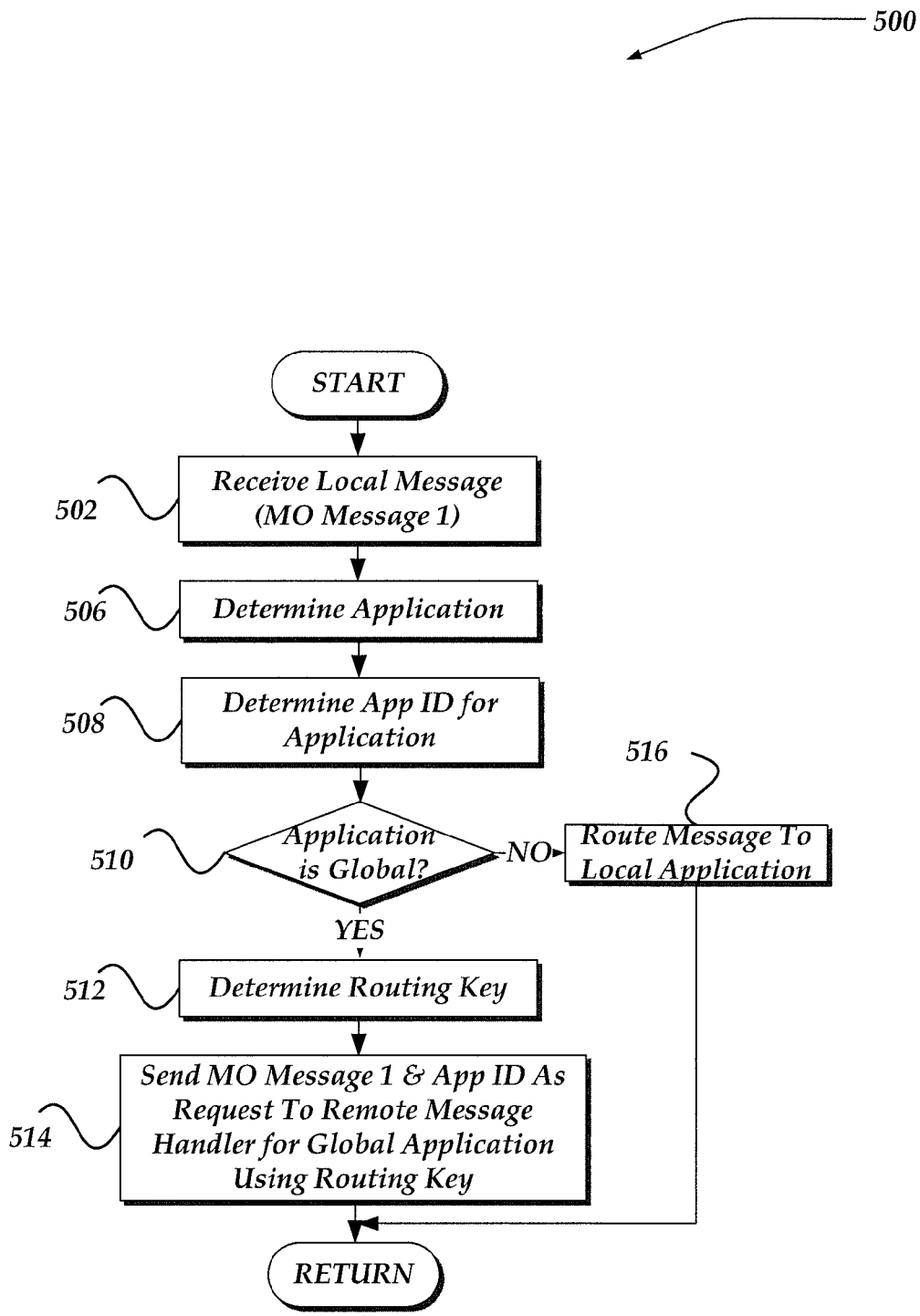
FIG. 5 illustrates a logical flow diagram generally showing one embodiment of an overview process for managing messages received by a message handler local to a client device.

FIG. 5 illustrates a logical flow diagram generally showing one embodiment of an overview process for messages received by a message handler local to a client device. Process 500 of FIG. 5 may represent one embodiment of block 404 of FIG. 4. However, the invention is not so constrained, and other embodiments may also be employed.

In any event, process 500 begins, after a start block, at block 502, where the message is received by the local message handler to the client device. Processing flows next to block 506, where a determination is made to which application to direct the message. As noted above, the determination may be based on a variety of information, including, but not limited to a short code and/or extension, a keyword, or the like. Processing flows next to block 508, where an application identifier is determined for the application. In one embodiment, the application identifier based on employing the keyword as an index into a data store, to locate the application identifier. However, other mechanisms may also be employed, including using a short code and/or extension, or the like.

In any event, processing moves next to decision block 510 where a determination is made whether the application is a global application or a local application. Such determination may be based, in one embodiment, upon information within the application identifier, and/or associated with the application identifier. If the application is a global application, processing flows to block 512; otherwise, processing flows to block 516, where the message is routed to a local application. Process 500 then returns to a calling process to perform other actions.

At block 514, however, a routing key or the like may be determined which maps the source message handler's identifier to a destination message handler that is configured to manage messages/responses with the global application. Determination of the destination message handler's identifier may also be made during, for example, when the application is determined to be global. That is, information indicating which message handler to forward the message may be included in a data store. The routing key may be configured in any of a variety of ways, including a source and destination addresses within a network packet, or the like. However, other routing key formats and/or structures may also be used, and the invention is not constrained to any particular structure and/or format. In any event, the routing key may then be used to forward the message to the appropriate destination message handler (e.g. a remote message handler). In one embodiment, additional information may also be sent with the message, including, but not limited to a client device identifier, the application identifier, and the like. Process 500 may then return to the calling process to perform other actions.

Figure 6:
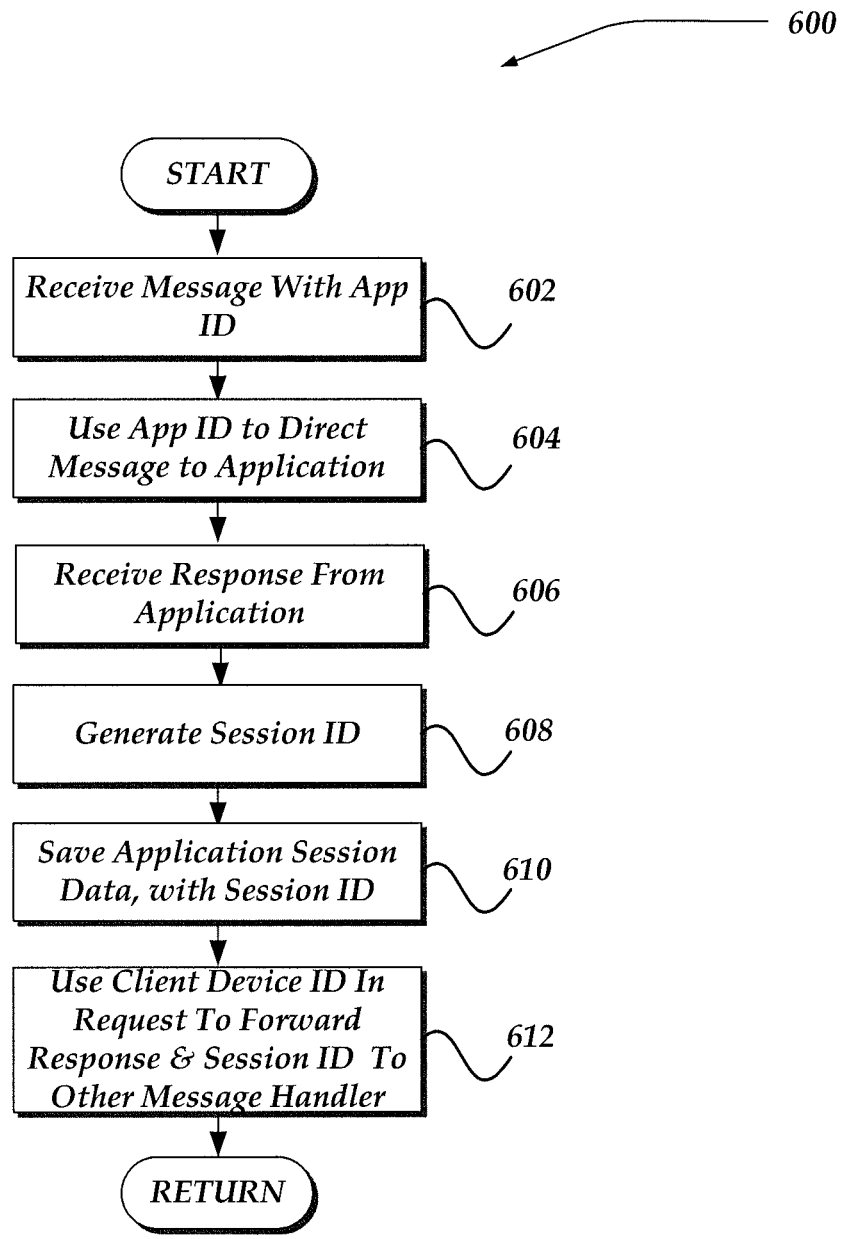
FIG. 6 illustrates a logical flow diagram generally showing one embodiment of an overview process for managing messages between the global application by a message handler remote to the client device.

FIG. 6 illustrates a logical flow diagram generally showing one embodiment of an overview process for managing messages between the global application and a client device by a message handler that is remote to the client device. As noted above, process 600 of FIG. 6 may represent one possible embodiment, of block 406 of FIG. 4.

Process 600 begins, after a start block, at block 602, where the remote message handler received the message from the local message handler, along with the application identifier, and, in one embodiment, additional information.

Processing flows next to block 604, where the application identifier is used to forward the message (and possibly at least some of the additional information) to the global application. At block 606 a response is received by the remote message handler from the global application.

Processing continues next where a session identifier may be generated. In one embodiment, the session identifier might be generated for message/response sessions that are determined to be managed remote from the client device. In another embodiment, the session identifier might be generated independent of whether the client device is remote or local.

Processing flows next to block 610 where session data for the message/response session, along with the session identifier are saved. Process 600 continues next to block 612, where the client device identifier may be used, in one embodiment, to determine the identity of the local message handler to which the response is to be sent. However, the invention is not so constrained to using the client device identifier. For example, in one embodiment, the routing key could also be used to determine the source message handler. In any event, in one embodiment, another routing key may be used to provide the response including the session identifier to the local message handler. As noted above, the session identifier may be sent in lieu of sending the session data over the network to the local message handler. Process 600 then returns to a calling process to perform other actions.

Figure 7:
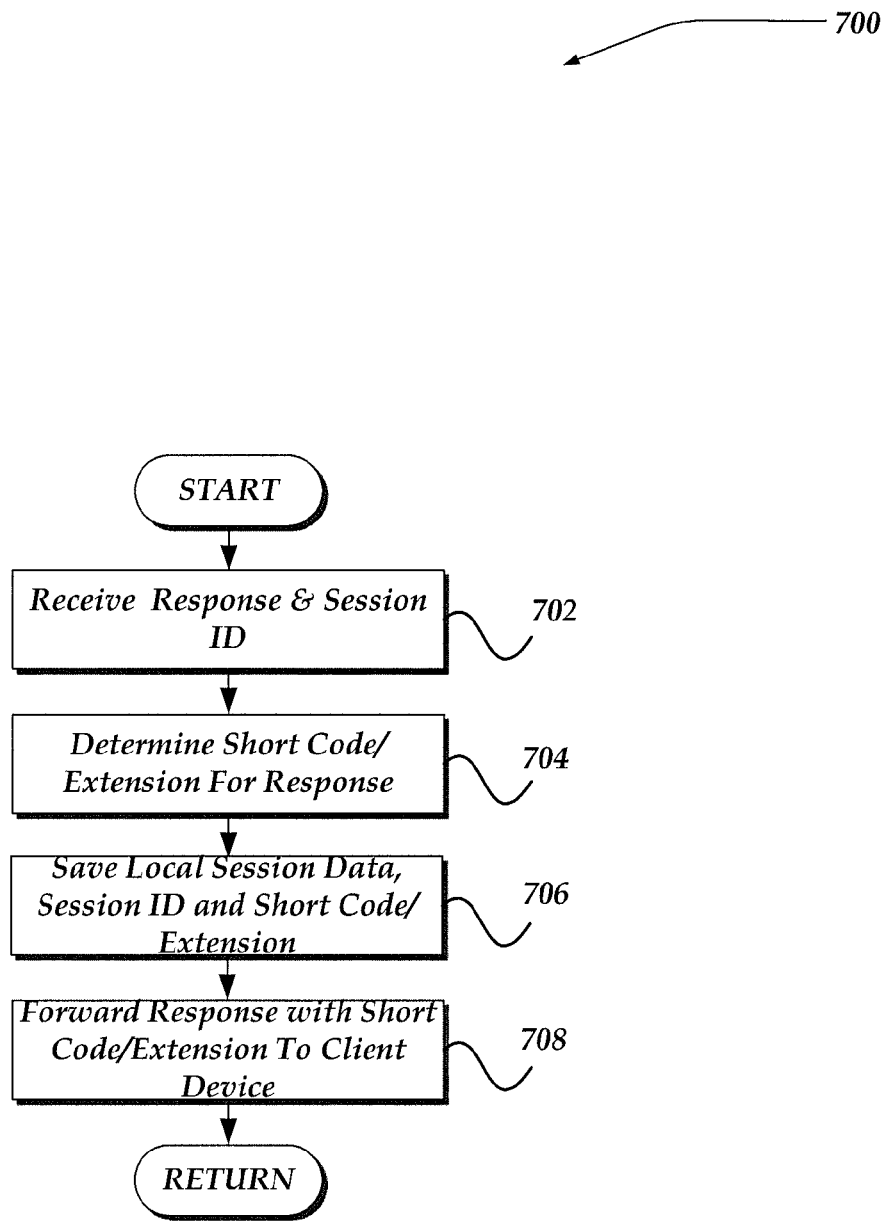
FIG. 7 illustrates a logical flow diagram generally showing one embodiment of an overview process for managing a response from the remote message handler by the local message handler.

FIG. 7 illustrates a logical flow diagram generally showing one embodiment of an overview process for managing a response from the remote message handler by the local message handler. As noted above, process 700 of FIG. 7 represents one embodiment of block 408 of FIG. 4.

Process 700 begins, after a start block, at block 702, where the response and session identifier are received by the appropriate local message handler. Processing flows to block 704, where a short code and/or extension may be determined for the response. In one embodiment, the response may be modified to include the short code and/or extension.

Processing flows next to block 706, where session data for the message/response session may be stored along with the session identifier, short code, and/or extension. In one embodiment, an identifier might also be stored indicating whether the associated application for the session is a global or local application. The modified response may then be sent to the client device. Process 700 may then return to a calling process to perform other actions.

Figure 8:
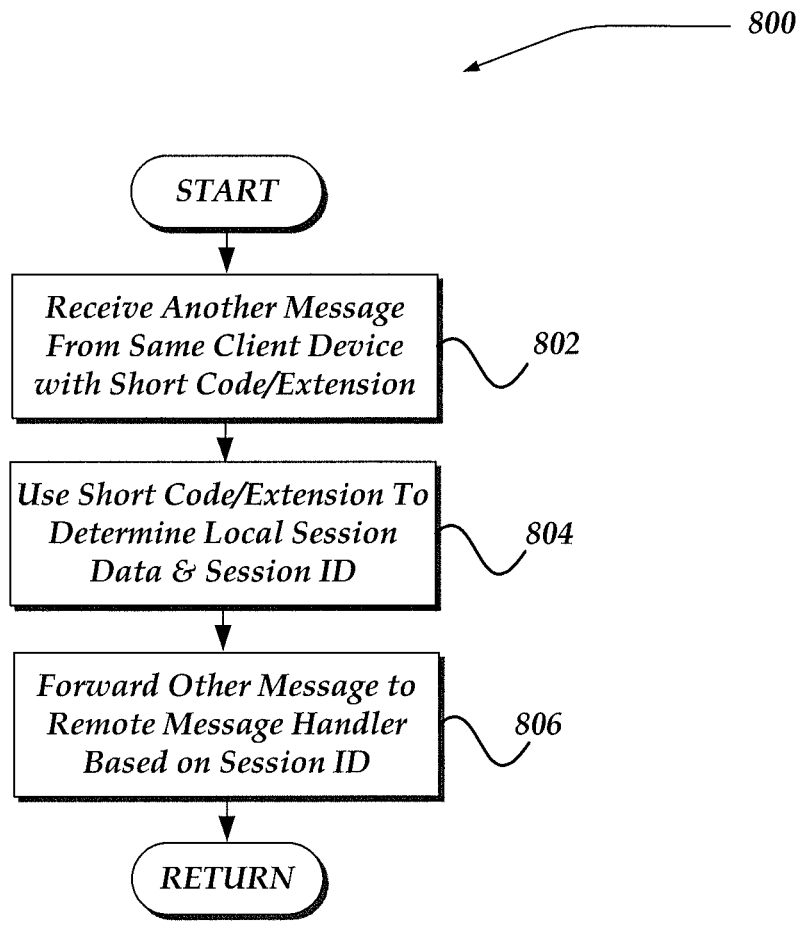
FIG. 8 illustrates a logical flow diagram generally showing one embodiment of an overview process for managing another message by the local message handler.

FIG. 8 illustrates a logical flow diagram generally showing one embodiment of an overview process for managing another message by the local message handler. As noted above, the client device and/or application may communicate more than once for a session. Thus, process 800 of FIG. 8 is directed toward illustrating one example, where the client device might send another message to the global application. Process 800 might represent, therefore, one embodiment of block 410 of FIG. 4.

As such, process 800 begins, after a start block, at block 802, where another message is received from the client device. In this instance, the other message is likely to include or otherwise employ the provided short code and/or extension. Process 800 flows next to block 804, where the short code and/or extension may, in one embodiment, be used to locate the stored session data for the client device session. Moving to block 806, the session identifier which was stored with the session data may then be provided with the other message to the appropriate message handler. It should be noted, that in one embodiment, the routing key might also be saved, and "re-used" to prepare and route the other message to the remote message handler. Moreover, as noted above, additional information might also be provided to the remote message handler, although it need not be. For example, while the global application identifier might have been provided in a prior message, use of the session identifier might negate a need to sending the application identifier. Similarly, other information such as the client device identifier, or the like, might not be sent with the other message, where the remote message handler may have stored such data with its local session data. In any event, process 800 may then return to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system for use in managing a communication with a mobile device over a network, comprising:
   A first network device that includes a first message handler that performs actions the first network device being local to a client device, including:
      receiving a message from the client device;
      examining at least a message body of the message to determine if the message is associated with a global application, and based on the determination routing the message towards the global application; and
   a second network device that includes a second message handler that is remote from the first message handler and is configured manage messages between the global application, the global application not executing on the first or second network device, and performs actions, including:
      receiving the message;
      forwarding the message to the global application;
      receiving a response from the global application;
      generating a session identifier for the response;
      maintaining session data for the message and the response, wherein the session data is managed distinct to the second message handler; and
      forwarding the response with the session identifier to the first message handler, wherein the first message handler is further configured to employ the session identifier to communicate another message and the session identifier to the second message handler, and to maintain session data local to the first message handler for the message and response and that is distinct from the session data of the second message handler.

2. The system of claim 1, wherein based on the determination that the message is associated with a global application further comprises: determining an application for the message based, in part, on a keyword search of at least the body of the message.

3. The system of claim 1, wherein routing the message towards the global application further comprises:
   determining where the global application is located internationally;
   determining that the second message handler is associated with the global application;
   generating a routing key based on a source identifier for the first message handler and a destination identifier for the second message handler; and
   using the routing key to route the message with the application identifier to the second message handler.

4. The system of claim 1, wherein the first message handler performs actions, further comprising:
   employing a short code or short, code extension to store the session identifier, session data associated with the response that is distinct from the session data of the second message handler, wherein the session data comprises at least one of at least a portion of the response, an identifier associated with the mobile device, the application identifier, and an indicator whether the application is global or local to the first message handler.

5. The system of claim 1, wherein forwarding the response with the session identifier to the first message handler further comprises:
   determining, by the second message handler, if the client device is local to the first message handler based on a client device identifier provided with the message.

6. The system of claim 1, wherein the first message handler is configured to perform actions, further comprising:
   when the response is received:
      allocating at least a short code or short code extension to the response; and
      forwarding the response to the client device with the allocated short code or short code extension, wherein the short code or short code extension is used to manage the session data maintained by the first message handler.

7. A server device for use in managing a communication with a mobile device over a network, comprising:
   a memory for use in storing data and machine instructions;
   a processor in communication with the memory and is configured to receive data and machine instructions that enable the processor to perform actions, including:

receiving a message from a client device that is directed towards an application;

determining a second server device that is configured to manage messages between the application as a global application based in part on examining a message body of the received message, the global application not executing on the server device or the second server device;

routing the message to the second server device;

receiving a response from the second server device from the global application and further receiving a session identifier that is associated with the response and is generated by the second server device;

providing the response to the client device;

managing session data for the message and the response using the session identifier, such that each server device separately manages their own session data for the message and response, and wherein the server device employs the session identifier to manage a second message from the client device towards the application by sending with the second message with the session identifier to the second server device.

8. The server device of claim 7, wherein the processor is enabled to perform actions, further comprising:

determining a short code or extension for the response based in part on a carrier associated with the client device; and providing the response to the client device with the short code or extension such that the short code or extension is usable to locate the session data separately managed by the server device.

9. The server device of claim 7, wherein the session identifier is used to associate session data managed by the server device and the second server device, and wherein the session identifier is sent over the network in lieu of sending session data.

10. The server device of claim 7, wherein determining a second server device further comprises:

determining an application identifier for the application based on examining the message and determining that the application is a global application;

determining that the second server device manages messages with the global application;

using a routing key to route the message with the application identifier, wherein the second server device employs the application identifier to identify the global application to which the message is forwarded.

11. The server device of claim 7, wherein receiving the response and the session identifier further comprises receiving the session identifier in lieu of receiving session data from the second server device.

12. A method operating on one or more network devices for use in managing a communication to a mobile device over a network, comprising:

receiving, at a local message handler executing within a network device that is local to a client device, a message from the client device;

examining at least a message body of the message to determine if the message is associated with a global application, and based on the determination that the message is associated with a global application, routing the message to a remote message handler executing on a second network device that is remote to the client device, and provides messages to and from the global application that executes on a third network device;

forwarding, by the remote message handler, the message to the global application, the global application not executing on the network device or second network device associated with either message handler;

receiving a response from the global application, by the remote message handler;

generating, by the remote message handler, a session identifier for the response;

providing the response with the session identifier to the local message handler, wherein the local message handler and the remote message handler independently maintains distinct session data associated with the message and response in lieu of sending session data over the network, and wherein the session identifier is used by the local message handler to forward another message including the session identifier to the remote message handler, and wherein the remote message handler employs the received session identifier, in part, to identify related session data maintained by the remote message handler for the message and response.

13. The method of claim 11, wherein based on the determination that the message is associated with a global application further comprises, determining that the message is associated with a global application based, in part, on examining of a message body of the message, and determining that the message body includes at least one keyword used to identify the global application.

14. The method of claim 12, further comprising:

determining, by the local message handler, at least one of a short code or an extension for the response;

providing, by the local message handler, the response to the client device with the short code or extension;

and employing, by the local message handler, the short code or extension during the other message from the client device to identify the related session data maintained by the local message handler.

15. The method of claim 12, wherein routing, by the local message handler, the message further comprises determining a routing key that comprises a source identifier associated with the local message handler, and a destination identifier associated with the remote message handler.

16. An apparatus for use in managing a communication to a mobile device over a network, comprising:

a memory for use in storing data and machine instructions;

a processor in communication with the memory and is configured to receive data and machine instructions that enable the processor to perform actions, including:

receiving a message from another apparatus, wherein the message includes an application identifier associated with an application that is configured to be a global application, the global application not executing on the apparatus or the other apparatus;

using the application identifier to forward the message to the global application;

receiving a response from the global application;

generating a session identifier for session data that comprises at least the message and the response;

storing the session data with the session identifier; and sending the response with the session identifier to the other apparatus, wherein the session identifier is sent in lieu of sending the session data, such that each apparatus maintains session data separate and distinct from each other apparatus, and wherein the session identifier is used by the apparatus to relate the session data maintained by the apparatus and the session identifier is sent to the apparatus with a subsequent message from the other apparatus.

17. The apparatus of claim 16, wherein sending the response to the other apparatus further comprises:

determining the other apparatus to which the response is sent, based in part on a client device identifier associated with the message.

18. The apparatus of claim 16, wherein the application identifier is determined to be associated with a global application based in part on examining a body of the message for a keyword, and examining a data store to identify that the application associated with the keyword is a global application.

19. The apparatus of claim 16, wherein receiving the message further comprises receiving a client device identifier associated with a sender of the message to the other apparatus.

\* \* \* \* \*